US 8,570,723 B2

(12) United States Patent
Myerchin

(10) Patent No.: US 8,570,723 B2
(45) Date of Patent: Oct. 29, 2013

(54) ACTUATED HINGE AND CABLE ASSEMBLY FOR USE WITH COMPUTER DISPLAY MONITORS

(75) Inventor: Christian P. Myerchin, Bellevue, WA (US)

(73) Assignee: Myerchin Enterprises, Inc., Bellevue, WA (US)

( * ) Notice: Subject to any disclaimer, the term of this patent is extended or adjusted under 35 U.S.C. 154(b) by 170 days.

(21) Appl. No.: 13/168,788

(22) Filed: Jun. 24, 2011

(65) Prior Publication Data

US 2012/0293937 A1 Nov. 22, 2012

Related U.S. Application Data

(60) Provisional application No. 61/487,576, filed on May 18, 2011.

(51) Int. Cl.
*G06F 1/16* (2006.01)

(52) U.S. Cl.
USPC ............ 361/679.05; 361/679.02; 361/679.21; 361/679.22; 248/125.2

(58) Field of Classification Search
USPC .......... 361/679.01–679.07; 248/274.1, 278.1, 248/276.1, 282.1, 283.1, 284.1, 289.11, 248/291.1, 292.13, 121–125.9, 128, 125.2, 248/125.8
See application file for complete search history.

(56) References Cited

U.S. PATENT DOCUMENTS

| | | | |
|---|---|---|---|
| 213,775 A | 4/1879 | Redman et al. | |
| 806,790 A | 12/1905 | Foersterling et al. | |
| 1,120,485 A | 12/1914 | Heinke | |
| 1,189,754 A | 7/1916 | Trenaman | |
| 1,515,242 A | 11/1924 | Dexter | |
| 1,658,771 A | 2/1928 | Nelson | |
| 1,765,168 A | 6/1930 | Laursen | |
| 1,937,386 A | 11/1933 | Howe | |
| 2,181,272 A | 11/1939 | Greenleaf | |
| 2,308,496 A | 1/1943 | Dieffenbach | |

(Continued)

FOREIGN PATENT DOCUMENTS

| JP | 2006-148504 A | 6/2006 |
|---|---|---|
| JP | 2008-083106 A | 4/2008 |

OTHER PUBLICATIONS

Ulanoff, L., "How Far Will Apple Go With Touch?" PCMag.com, Jun. 7, 2011, 2 pages http://www.pcmag.com/article2/0,2817,2386548,00.asp accessed Sep. 6, 2011.

(Continued)

*Primary Examiner* — Jinhee Lee
*Assistant Examiner* — Dimary Lopez
(74) *Attorney, Agent, or Firm* — Frommer Lawrence & Haug LLP; Jamie L. Wiegand

(57) ABSTRACT

Embodiments are directed towards a support structure for electronic displays, such as a computer display monitor, tablet, or the like, such that a cable actuated hinge moves the display from an elevated vertical position away from a user to a lower horizontal position closer to the user. In one embodiment, a computer display is pivotally connected to at least one display arm. The other end of the display arm(s) are pivotally connected to a base. One or more cable(s) are pivotally connected to the base. The cable(s) attaches to the display such that when the display arm(s) is pivoted downward the cable(s) pulls against the display arm(s) and toward the base.

18 Claims, 10 Drawing Sheets

(56) References Cited

U.S. PATENT DOCUMENTS

| | | | |
|---|---|---|---|
| 2,414,684 A | 1/1947 | Wohlforth | |
| 2,441,037 A | 5/1948 | Sherrin | |
| 2,506,852 A | 5/1950 | Barcus | |
| 2,636,549 A | 4/1953 | Geller | |
| 2,648,146 A | 8/1953 | Foster | |
| 2,834,568 A | 5/1958 | Foster | |
| 2,872,178 A | 2/1959 | Holland | |
| 2,924,443 A | 2/1960 | Townsend et al. | |
| 3,097,712 A | 7/1963 | Johnson | |
| 3,253,473 A | 5/1966 | Chisholm et al. | |
| 3,333,912 A | 8/1967 | Kunz et al. | |
| 3,820,752 A * | 6/1974 | Oram | 248/284.1 |
| 3,981,340 A | 9/1976 | Anderson et al. | |
| 4,100,858 A | 7/1978 | Bue et al. | |
| 4,165,530 A | 8/1979 | Sowden | |
| 4,383,486 A | 5/1983 | Reineman et al. | |
| 4,568,052 A | 2/1986 | Solomon et al. | |
| 4,571,775 A | 2/1986 | Leonard | |
| 4,602,855 A | 7/1986 | Frey | |
| 4,756,054 A | 7/1988 | Mitts et al. | |
| 4,848,244 A | 7/1989 | Bennett | |
| 4,953,256 A | 9/1990 | Salmela et al. | |
| 5,253,832 A | 10/1993 | Bolas et al. | |
| 5,501,420 A | 3/1996 | Watt et al. | |
| 5,609,316 A * | 3/1997 | Tigliev | 248/123.11 |
| 5,681,079 A | 10/1997 | Robinson | |
| 5,779,209 A | 7/1998 | Rello | |
| 5,819,670 A | 10/1998 | O'Connor et al. | |
| 5,855,344 A | 1/1999 | Rogers | |
| 5,876,008 A | 3/1999 | Sweere et al. | |
| 5,918,841 A | 7/1999 | Sweere et al. | |
| 6,057,810 A | 5/2000 | Roell et al. | |
| 6,163,451 A | 12/2000 | Chiu | |
| 6,288,891 B1 | 9/2001 | Hasegawa et al. | |
| 6,378,829 B1 | 4/2002 | Sträter et al. | |
| 6,382,577 B1 | 5/2002 | McCoy et al. | |
| 6,433,761 B1 | 8/2002 | Remitz | |
| 6,441,323 B1 | 8/2002 | Montagnino et al. | |
| 6,484,993 B2 * | 11/2002 | Huffman | 248/323 |
| 6,663,064 B1 | 12/2003 | Minelli et al. | |
| 6,672,553 B1 | 1/2004 | Lin | |
| 7,032,425 B1 | 4/2006 | Esh | |
| 7,061,753 B2 | 6/2006 | Michoux et al. | |
| 7,252,277 B2 | 8/2007 | Sweere et al. | |
| 7,289,315 B2 | 10/2007 | Hillman et al. | |
| 7,421,812 B2 | 9/2008 | Liou et al. | |
| 7,421,813 B2 | 9/2008 | Liou et al. | |
| 7,445,187 B2 * | 11/2008 | Shin | 248/324 |
| 7,494,104 B2 | 2/2009 | Baek | |
| 7,584,933 B2 | 9/2009 | Chih | |
| 7,630,193 B2 | 12/2009 | Ledbetter et al. | |
| 7,637,463 B2 | 12/2009 | Yen et al. | |
| 7,651,058 B2 | 1/2010 | Cho et al. | |
| 7,690,605 B2 | 4/2010 | Lee et al. | |
| 7,717,384 B2 | 5/2010 | Kim | |
| 7,726,616 B2 | 6/2010 | Zhang et al. | |
| 7,810,773 B2 | 10/2010 | Chi | |
| 7,828,252 B2 | 11/2010 | Parsons | |
| 2003/0214480 A1 | 11/2003 | Chng | |
| 2005/0023424 A1 | 2/2005 | Chow et al. | |
| 2006/0091274 A1 * | 5/2006 | Asamarai et al. | 248/292.11 |
| 2006/0231711 A1 | 10/2006 | Shin | |
| 2006/0255216 A1 | 11/2006 | Cho et al. | |
| 2007/0001076 A1 * | 1/2007 | Asamarai et al. | 248/281.11 |
| 2007/0007412 A1 | 1/2007 | Wang | |
| 2007/0194182 A1 | 8/2007 | Lee | |
| 2009/0173845 A1 | 7/2009 | Wang et al. | |
| 2010/0001148 A1 | 1/2010 | Mesfin et al. | |
| 2010/0250152 A1 | 9/2010 | Farrow | |

OTHER PUBLICATIONS

Boxall, A., "Maybe I Don't Want a Touchscreen Laptop," www.digitaltrends.com, Nov. 1, 2012.
Davis, C., "Will Touchscreen Technology Eliminate Ergonomic Risk in Computing and Gaming?" The ERGOLAB, Apr. 20, 2010.
Pogue, D., "Why Touch Screens Will Not Take Over," Scientific American, Jan. 3, 2013.
Tessler, F., "The Hidden Danger of Touchscreens," InfoWorld.com, Jan. 11, 2012.
International Search Report and Written Opinion for International Patent Application No. PCT/US2012/038195 mailed Dec. 27, 2012.
International Search Report and Written Opinion for International Patent Application No, PCT/US2012/038207 mailed Dec. 26, 2012.
Official Communication for U.S. Appl. No. 13/109,861, mailed Jun. 5, 2013.

* cited by examiner

| | | |
|---|---|---|
| Beta β Bottom (degrees) | 60 | Bottom angle of display arm pivot |
| Beta Bottom Radians | =RADIANS(B1) | |
| Line AB | 10 | Length of the display arm |
| r | 1 | Radius of the cam |
| Ax | 0.75 | X offset of display arm pivot point |
| Ay | 0 | Y offset of display arm pivot point |
| Bx | =B4 | |
| Beta Top | =(PI()/2 − ASIN(B8/B3)) | =360*B9/(2*PI())  degrees |
| Total Beta | =B2+B9 | =360*B10/(2*PI())  degrees |
| By | =B3*SIN(B9) | |
| B'x | =B5+B3*COS(B2) | |
| B'y | =B3*SIN(B2) | |
| Cx | 0 | X offset of cable attachment point |
| Cy (Goal Seek with Diff d to d') | 2.00771694599299 | Y offset of cable attachment point |
| CD1 or d | | |
| Distance between two points $d = \sqrt{(x_2 - x_1)^2 + (y_2 - y_1)^2}$ | | |
| CB' | =SQRT(SUMSQ((B14-B16), (B15-B18))) | |

*FIG. 6A*

Pythagorean Thorium
Given triangle CB'D
$CB'^2 = r^2 + CD3^2$
$CD3 = sqrt(CB'^2 - r^2)$
CD3                                                              =SQRT(B23^2-B4^2)
slope of line CB' (rise/Run) = m                                 =(B15-B18)/(B14-B16)
Equation of line CB'
y − B'y = m(x − B'x)
y = mx − mB'x + B'y
(−mBx + By) = c
Angle B'CD3                                                      =B29*B14-B15
See Diagram #2                                                   =ASIN(B4/B23)
Move c to origin and get the offset and recalculate B'
B'x with C at origin = B'x − Cx                                  =B14-B16
B'y with C at origin = B'y − Cy                                  =B15-B18
∧                                                                =ASIN(B37/B23)
α                                                                =B39-B34
D3x with C at origin = CD3 Sin (α)                               =B28*SIN(B40)
D3y with C at origin = CD3 Cos (α)                               =-B28*COS(B40)
Recalculate D with moving C back to original position
D3x = D3x with C at origin + Cx                                  =B41+B16
D3y = D3y with C at origin + Cy                                  =B42-B18
Θ = ASIN ((D3x − B'x)/r)                                         =ASIN((B44-B14)/B4)
K = r * (π + θ)                                                  =B4*(PI()+B46)
d' = CD3 − K                                                     =B28-B47
diff d to d'                                                     =B19-B48

Use the "Goal Seek" function to set cell to 0 by adjusting Cy

FIG. 6A (cont.)

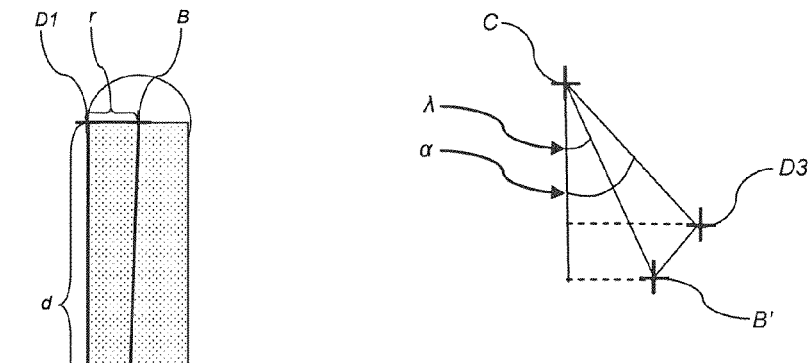
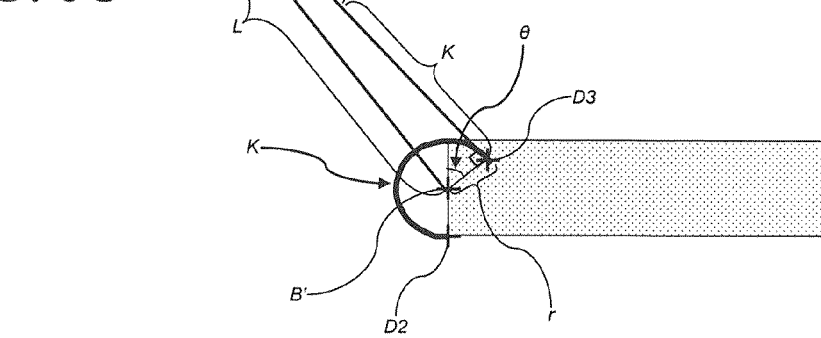
*FIG. 6B*
*FIG. 6C*

US 8,570,723 B2

ACTUATED HINGE AND CABLE ASSEMBLY FOR USE WITH COMPUTER DISPLAY MONITORS

CROSS-REFERENCE TO RELATED APPLICATIONS

This application claims the benefit of U.S. Provisional Application Ser. No. 61/487,576 filed on May 18, 2011, entitled "Actuated Hinge And Cable Assembly For Use With Computer Display Monitors," the benefit of the earlier filing date of which is hereby claimed under 35 U.S.C. §119 (e) and further incorporated by reference in its entirety.

TECHNICAL FIELD

Various embodiments relate generally to computer display mounting devices and more particularly, but not exclusively to a hinge and cable assembly that is useable for displays, such as touch screen displays, where the display is tilted away from a central mounting point by the cable pulling against a pivoting arm.

BACKGROUND

Electronic displays with data input capability may be considered as having two distinct usage modes. One usage mode is for information display, while a second usage mode is where a touch screen interaction and display are provided simultaneously. In the first usage mode, the typical computer display involves a standard computer monitor, with an ergonomic design that encourages the display to be at atypical arm's length away from a user and at or slightly below eye level. However, this position may not be ideal for the second usage mode where touching the screen is intended as a primary method of input. For the second usage mode, the display is often placed closer to the user, lower and in a more horizontal position than in a typical first usage mode. This can be accomplished by placing the display at the end of an arm and pivoting the arm from an elevated position to a lower position. The actions of moving the display closer to the user, lowering it, and titling it to a more horizontal position are among the considerations, that embodiments of the present invention have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIGS. 6A-C provide one non-limiting, non-exhaustive example embodiment for determining a cable attachment point location.

DETAILED DESCRIPTION

Figure 1A:
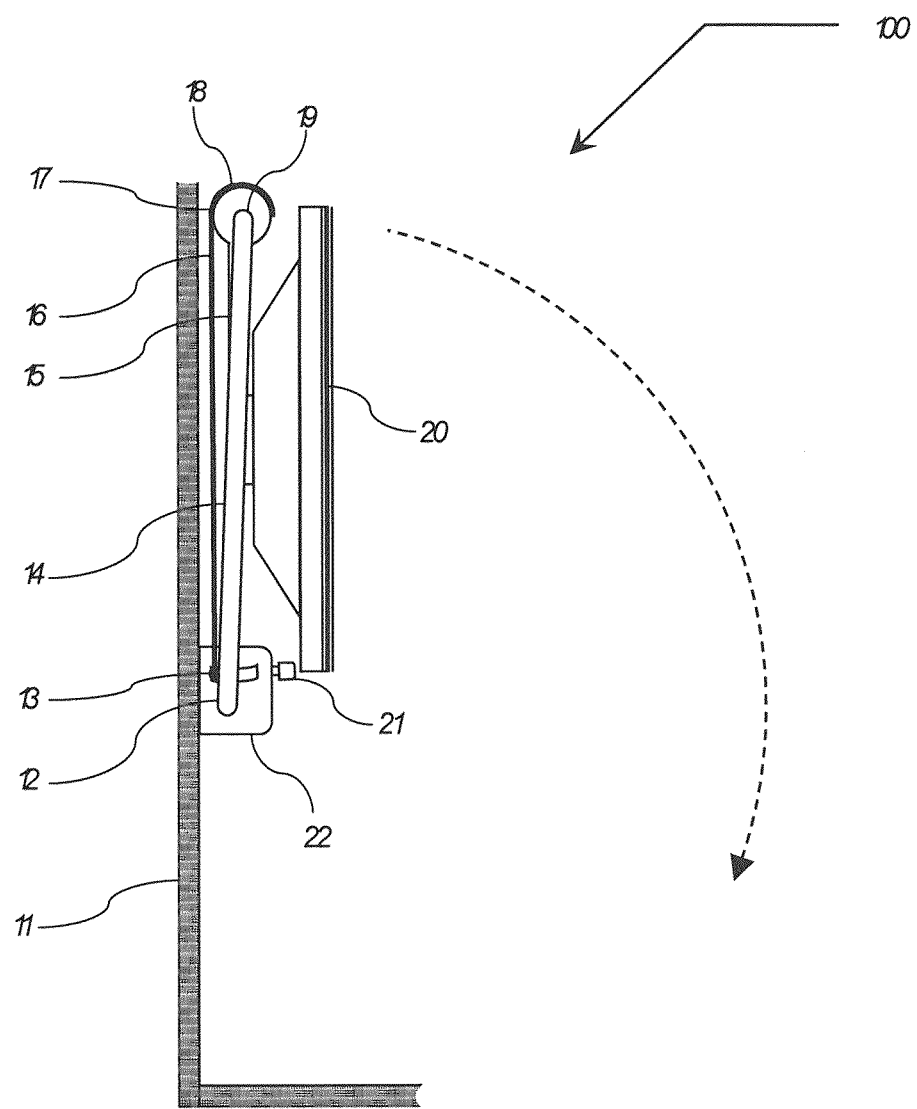
FIGS. 1A-1C illustrate perspective views of one embodiment of a wall mounted hinge with a cam rotated display in various angled positions.

Embodiments now will be described more fully hereinafter with reference to the accompanying drawings, which form a part hereof, and which show, by way of illustration, specific embodiments which may be practiced. This invention may, however, be embodied in many different forms and should not be construed as limited to the embodiments set forth herein; rather, these embodiments are provided so that this disclosure will be thorough and complete, and will fully convey the scope to those skilled in the art. The following detailed description is, therefore, not to be taken in a limiting sense.

Throughout the specification and claims, the following terms take the meanings explicitly associated herein, unless the context clearly dictates otherwise. References to "one embodiment," "an embodiment," "another embodiment," as used herein indicates that a particular feature, structure, or characteristic described in connection with the embodiment is included in at least one embodiment. However, the phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in." includes "in" and "on."

In addition, as used herein, the term "display" is equivalent to the term "display and/or display holder," and refers to a situation where either item or both items can be used. The term is used to aid in readability as this is a commonly referred to term herein.

The following briefly describes the various embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated embodiments are directed towards a hinge assembly for use with a computer display device, the hinge having at least one rigid arm that is pivotally connected at one pivot point to a base and at another pivot point to a *display. A cable attaches between the base and the *display, as discussed further below. As the rigid arm is lowered towards a surface, the cable pulls against the rigid arm and creates a rotational moment about the pivot point where the rigid arm attaches to the *display. This causes the *display to tilt away from the base in a controlled manner.

In one embodiment, a computer *display is pivotally connected to at least one display arm. The other end of the display arm(s) are pivotally connected to a base. When the display arm(s) points upward (perpendicular) from the base relative to the force of gravity, the *display hangs in a vertical position. One or more cable(s) are pivotally connected to the base. The cable(s) attaches to the *display such that when the display arm(s) is pivoted downward the cable(s) pulls against the display arm(s) and toward the base. The cable(s) connection point at the *display is offset from the display arm(s) pivot point such that when the cable is pulled, a torque is exerted on the *display to tilt the *display away from the base. The cable connection point at the base can be chosen such that the tilt of the *display in the lower position is controlled relative to the display arm's pivot angle.

As disclosed further below, an apparatus is disclosed for moving a *display from an elevated vertical position away from the user to a lowered horizontal position closer to the user. Such arrangement is directed towards providing a simplistic design for ease of manufacture and reliability of at least the apparatus. Other advantages of one or more aspects will be apparent from consideration of the drawings and ensuing description.

Partial List of Reference Numerals

11—Vertical Mounting Surface
12—Display Arm Pivot Point at Base
13—Adjustable Cable Attachment Point
14—Display Arm
15—Display Mount
16—Cable
17—Cable Point of Tangency
18—Cam
19—Display Arm Pivot Point at Display Mount
20—Display
21—Horizontal Tilt Adjustment Knob
22—Attached Base
23—Tilt Adjustment Screw
24—Threaded Attachment Point
25—Torsion Spring
26—Shaft Connecting to Display Arms
30—Torsion Spring Holder
31—Horizontal Tilt Adjustment Knob
32—Freestanding Base
40—Horizontal Tilt Adjustment Screw
41—Mounting Bracket for Tilt Screws
42—Vertical Tilt Adjustment Screw
43—Display in Vertical State
44—Extension Spring
45—Fixed Cable Connection Point to Display Mount
46—Display Tablet
47—Display Holder for Tablet Display or other Display Device
48—Two Axis Cable Attachment
49—Display in Horizontal State
50—Attached Base with Fixed Cable Connection
51—Fixed Cable Connection Point to Base
52—Small Cam Offset from Rigid Arm Connection
53—Display in Vertical Position
54—Rotation Position when Cable Becomes Taut
55—Horizontal Position Illustrative Embodiments Each of the FIGURES discussed below may include many more or less components than those shown in the FIGURES. Moreover, not all the components may be required to practice various embodiments and variations in the arrangement and type of the components may be made. However, the components shown are sufficient to disclose various illustrative embodiments for practicing the present invention.

Figure 1B:
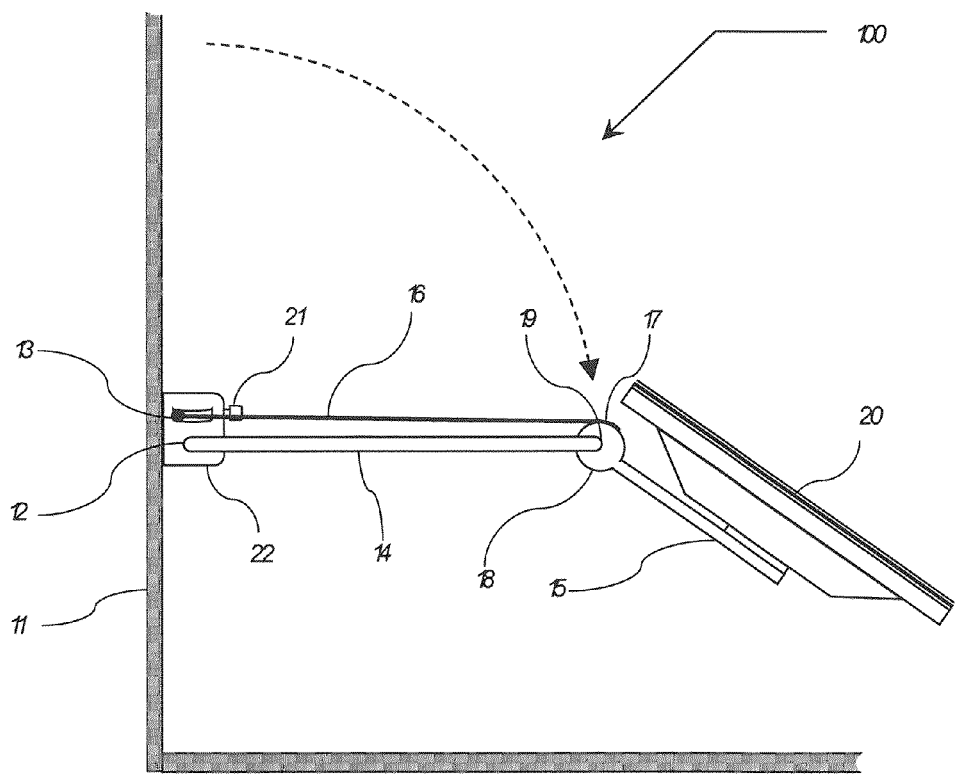
Figure 1C:
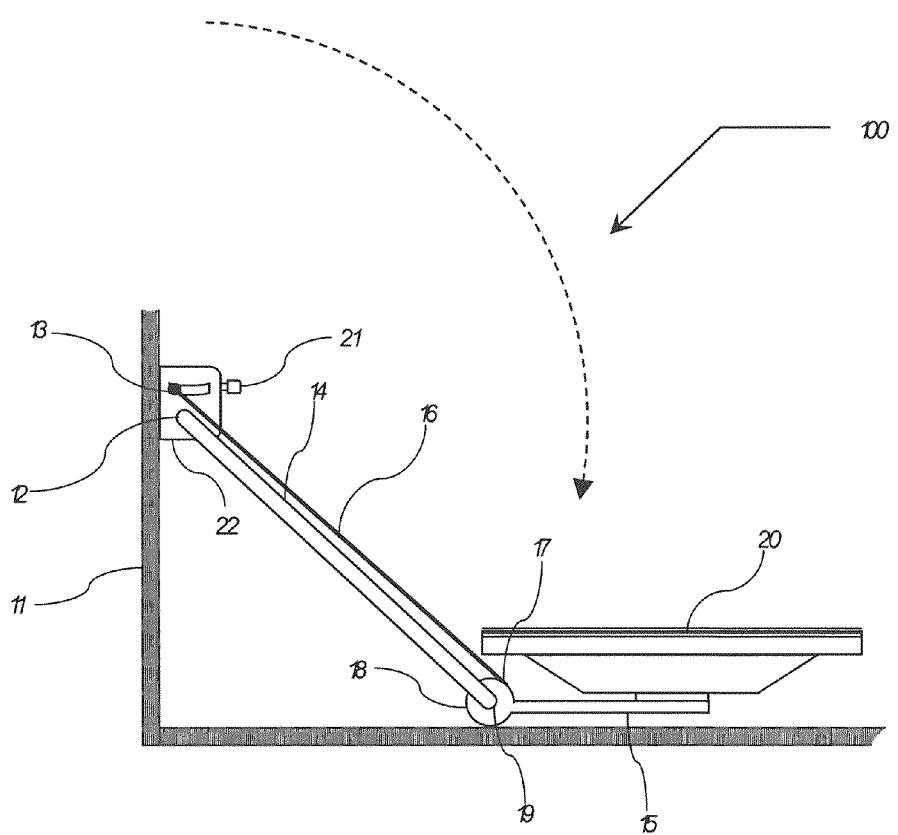
Figure 2:
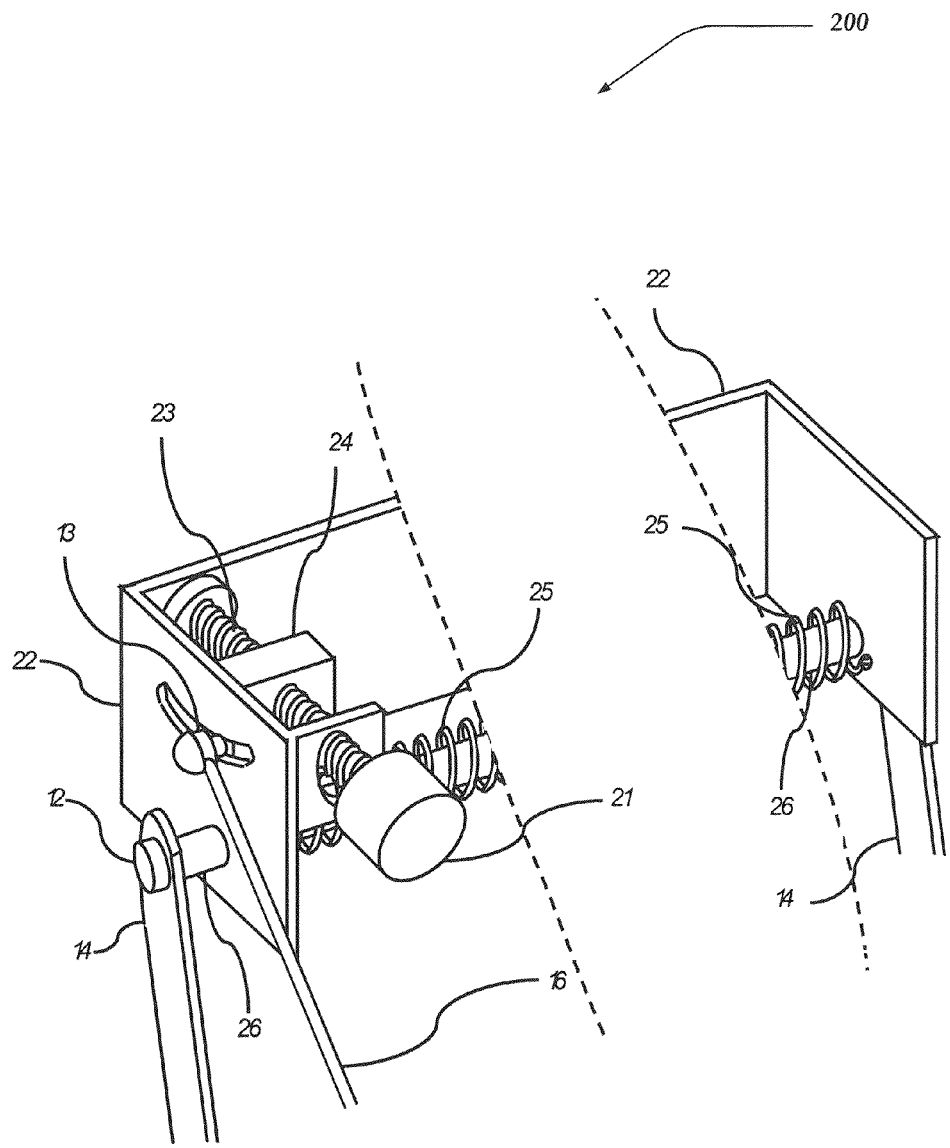
FIG. 2 illustrates a second perspective view of one embodiment of details of the wall mounted hinge of FIGS. 1A-1C.

FIGS. 1A-1C and 2 illustrate perspective views of one embodiment of cable articulated hinge, mounted on a vertical surface, with a computer display in various angled positions. As shown in FIG. 1A and FIG. 2, apparatus 100 includes base 22 attached to vertical surface 11. In one embodiment, vertical surface 11 might be a wall. In one embodiment two display arms 14 are rigidly attached to a shaft 26 that runs through base 22. A torsion spring 25 attaches to the shaft 26 and the base 22 such that it provides a torque to rotate the display arms 14 upwards and towards the vertical surface 11. In one embodiment, horizontal adjustment knob 21 attaches to tilt adjustment screw 23 such that both rotate in unison. Tilt adjustment screw 23 passes thorough base 22, screws into threaded attachment point 24, and further then connects to base 22 such that the screw 23 is anchored from moving in or out relative base 22. Threaded attachment point 24 is connected to adjustable cable attachment point 13 such the both cable attachment points 13 and 24 move when screw 23 is turned. Cable 16 pivotally connects to movable attachment point 13. Cable 16 extends to a cam 18 at tangent point 17. In one embodiment, the cam 18 is circular and cable 16 may be wrapped around and attached to the cam 18. The cam 18 is rigidly connected to a display mount 15 such that both cam 18 and display mount 15 rotate about a pivot point 19 together. The display arm 14 pivotally connects to both the cam 18 and display mount 15 at pivot point 19. The cam 18 is constructed such that the radius from the center of the pivot point 19 to cable tangent point 17 forms a lever arm that exerts a torque to rotate the cam 18, display mount 15, and display 20. Cable attachment point 13 is positioned such that as display arm 14 pivots downward (see dashed arrow indicating direction of movement), the cable 16 will 'unwind' about cam 18, thereby providing for a corresponding motion of display mount 15 and display 20. As constructed, the cable 16 operates in a single direction—providing a pulling action rather than a push/pull action as the display arm 14 moves.

In one embodiment, the base 22 is made of folded sheet metal with a molded plastic cover. However, base 22 can be made wholly of plastic or metal or any other material such that it provides a mounting point for hinge parts and is sufficiently rigid to not bend during hinge operation.

In one embodiment, the cable 16 is made of vinyl coved steel with a uniform helical arrangement of wires concentrically stranded together. However, synthetic fiber monofilament, synthetic fiber braided, metal chain, or any other flexible material can be used, provided that it has little elasticity relative to its length.

In one embodiment, the cam 18 is circular in shape where it is wrapped by the cable 16. However, the cam 18's shape may be changed to allow for customization of display mount 15 tilt during hinge operation.

Display mount 15 further attaches to a back of a display 20 at a second end of display mount 15, or some definable attachment point along display mount 15. In one embodiment, display mount 15 is implemented as a rotatable arm, configured to rotate about display arm pivot point 19. FIG. 2 illustrates two display arms 14; however, other embodiments may employ a single display arm 14, or even multiple arms beyond two.

Display 20 can be virtually any computer monitor for providing an image to a user, including, but not limited to a liquid crystal display (LCD) device, or the like. In one embodiment, display 20 may be a computer display device that is configured as a touch screen display that enables users to interact and provide inputs to a computing system by touching a screen of the display 20. Display 20 may provide any of a variety of mechanisms for attaching to display mount 15, including, but not limited to bolts, screws, hooks, pin connectors, or the like. For example, in one embodiment a screw element may be employed to attach display 20 to display mount 15. By employing such mechanisms, display 20 may be removed from display mount 15 and/or other display devices may be attached to display mount 15. However, in other embodiments, display 20 may be attached to display mount 15 to not be readily removable. For example, in one embodiment, display 20 may be glued, soldered, welded, or otherwise permanently attached to display mount 15.

In one embodiment, the display arm pivots points 12 and 19 may be constructed as a detent hinge, a frictional hinge or any form of hinge that limits display movement when at a desired pivot or tilt position. This may be useful to allow a user to grasp the display 20 and move the display 20 to a desired location and not have the display 20 move after the user has released their grasp or when the user is otherwise lightly touching the display 20's surface.

In one embodiment, a motor, control circuit, and/or capacitive switch or similar component may be employed to lock or unlock the display arm's angle such that when a user touches the switch, the more or other control circuit releases a brake mechanism and allows the display arm to pivot. When the user releases the switch, the motor or other control circuit activates the brake mechanism to lock the display arm's pivot position.

Illustrative Operations

The operation of certain aspects of the embodiments will now be described with respect to FIGS. 1A-1C and 2. FIGS. 1A-1C and 2 illustrate perspective views of one embodiment of a cable articulated hinge mounted on a vertical surface with a computer display in various angled positions. As illustrated, FIG. 1A displays a vertical position for the display 20; FIG. 1B illustrates a tilted horizontal position for the display 20, and FIG. 1C shows a flat horizontal position. FIG. 2 illustrates a detailed view of base 22 and its component parts. It should be readily apparent to one of skill in the art that such illustrated positions are non-limiting, and other positions may be obtained when the computer display is rotated about the base, as described further below. Moreover, as stated elsewhere, not all components may be illustrated. For example, base 22 may include an otherwise not shown protective cover for safety, dust protection, or the like.

In any event, when display 20 is in a vertical position, FIG. 1A, display 20 is in its highest elevation, relative to base 22. As used herein, the term "vertical," with respect to display 20 refers to a screen viewing face of display 20 that is used to display images or other content, being vertical or approximately vertical (or otherwise parallel with respect to vertical mounting surface 11) within a few degrees of tolerance with respect to the force of gravity. Again, FIG. 1A illustrates one embodiment of such vertical configuration.

As shown in FIGS. 1B-1C, as display arm 14 is lowered (see dashed arrow indicating direction of movement), such as being repositioned downwards towards a resting surface like a desk or the like, as display arm 14 is lowered, the cable attachment point 13 is positioned such that a length between attachment point 13 and a tangent point 17 will increase. In one embodiment, this may result from a rotation of cam 18 about display arm pivot point 19. The radius from the center of the pivot point 19 to cable tangent point 17 forms a lever arm that will exert a torque to rotate cam 18. Cam 18 will also rotate display mount 15 around display pivot point 19 and tilt display mount 15 away from base 22, such as illustrated in non-limiting FIG. 1B. As shown, tangent point 17 then is repositioned closer to an attachment point on cam 18 as cable 16 'unwinds' from the cam 18.

In one embodiment, the cam 18 is positioned toward the top the display 20, relative to the force of gravity when in the vertical position FIG. 1A. Having the can 18 near the top portion of the display 20 allows a user to touch the top of display 20 and not have the touch pressure cause the display 20 to tilt backward. In one embodiment, it is possible to add a torsion spring between rigid arm 14 and display mount 15 such that the display mount 15 is torqued to rotate in the same rotational direction as the dashed arrow for FIG. 1A. The added torque from the spring allows the pivot point 19 to be moved closer to the center of the display 20 without a user's touch pressure causing the display 20 to tilt backward.

In one embodiment, the horizontal tilt adjustment knob 21 moves the cable attachment point 13 along a semicircular opening in the base 22. The center point of the semicircular opening is the point of tangency 17 when the assembly 100 is in the vertical position FIG. 1A. The cable attachment point 13 may be positioned any point in this semicircular opening and not affect the tilt of the display 20 in the vertical position. When the assembly 100 is lowered from vertical position FIG. 1A to a lower position e.g. FIG. 1B the movement of attachment point 13 in the semicircular path will have an effect on the displays tilt. In one embodiment, the path of the adjustment point 13 can be chosen to affect only horizontal tilt, only vertical tilt or both. In one embodiment, adjustment screw 23 can also be driven with a motor instead of a knob 21 such that display 20 tilt can be adjusted electrically.

FIGS. 6A-C provides one non-limiting, non-exhaustive approach for determining a cable attachment point location 13, as illustrated in FIGS. 1A-1C and 2, given: display arm pivot location, length of display arm, diameter of the cam, angle of display arm pivot and display tilt goes from 90 to 0 degrees with respect to a defined reference, such as a table, wall, or the like. As illustrated, FIG. 6A provides an example table of various components shown in FIGS. 6B-6C, in a first column, example mechanisms for determining values for the various components in the second column, and comments in the last columns. While FIGS. 6A-C illustrates one approach, others are also envisaged, and thus other embodiments are not to be construed as being limited to that illustrated in FIGS. 6A-B.

Alternative Embodiments

Figure 3:
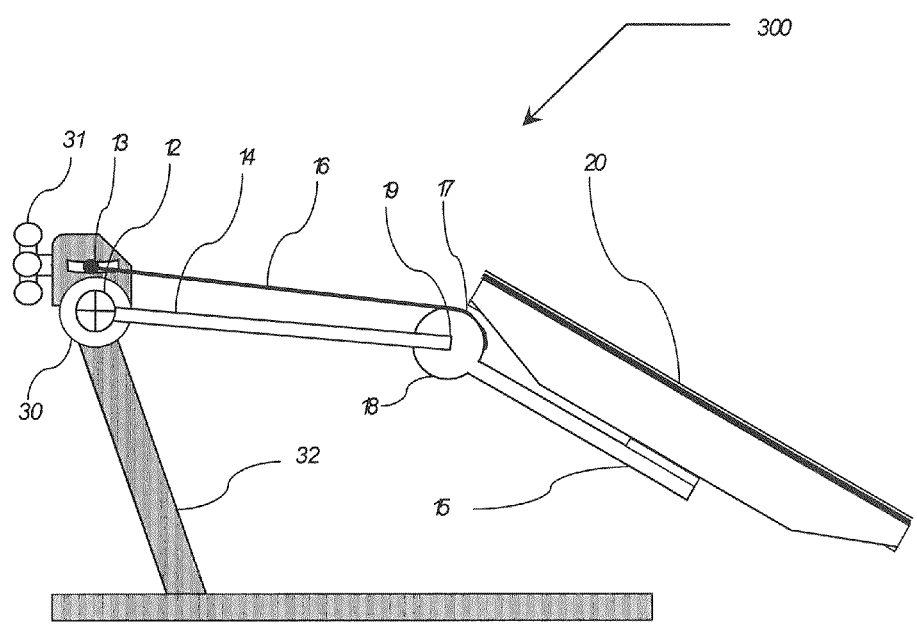
FIG. 3 illustrates another embodiment of a perspective view of an elevated hinge on a portable base with a cam rotated display in various angled positions.

Other embodiments are also envisaged. For example, FIG. 3 illustrates one embodiment of a perspective view of a freestanding base 32 attached to a similar cam actuated cable hinge as shown in FIGS. 1A-1C. Using a freestanding base 32 with the hinge apparatus 300, allows the display 20 to be used as in a more traditional computer display monitor application when in the vertical position. In one embodiment, the horizontal tilt adjustment knob 31 extends out the back of the hinge, rather than being in the front of the hinge as shown in FIG. 2. The horizontal tilt adjustment knob 31 operates by the similar to the previous embodiment of FIGS. 1A-1C and FIG. 2. When the horizontal tilt adjustment knob 31 is turned clockwise or counterclockwise it will move cable attachment point 13 towards or away from the horizontal tilt adjustment knob 31. This movement will most affect the tilt of display 20 in the horizontal position but not affect the tilt of the display 20 in the vertical position. A torsion spring holder 30 contains a torsion spring (not shown) that attaches at one end of the torsion spring to display arm 14 and at an other end of the spring to base 32, such that a counter torque is imparted on display arm 14 when display arm 14 is lowered.

Figure 4:
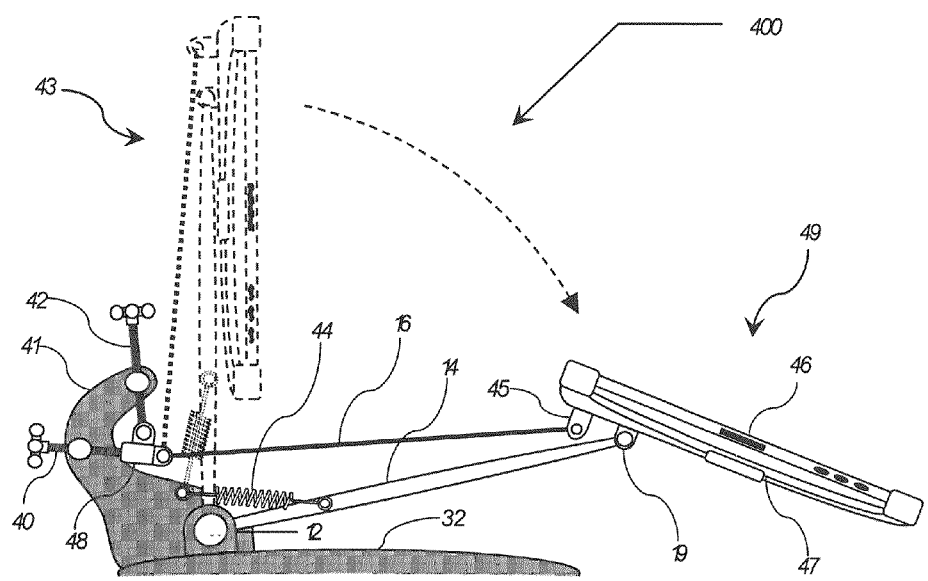
FIG. 4 illustrates another embodiment of a perspective view of a hinge on portable base with a fixed cable attachment point on a display device.

FIG. 4 illustrates another alternate embodiment of a perspective view of a base 32 having a cable 16 directly connected to display holder and a two axis adjustable cable connection point at the base. Apparatus 400 of FIG. 4 shows a display arm 14, display holder 47 and display tablet 46 in vertical position 43. As the display tablet 46 is lowered as indicated by the dashed arrow the cable 16 pulls against the movement of display arm 14. This creates a lever arm between cable connection point 45 and pivot point 19 to exert a torque that rotates display holder 47 around pivot point 19 and tilts display tablet 46 away from display base 32 into a horizontal position.

In one embodiment, the cable connection point at the base 48 is connected by two screws. A horizontal tilt adjustment screw 40 is connected to a mounting bracket 41 via a pilotable threaded stud. The horizontal tilt adjustment screw 40 moves the cable attachment point 48 primarily towards or away the display tablet 46 when the display tablet 46 is in a horizontal position 49. The horizontal tilt adjustment screw 40's movement of attachment point 48 is not liner as it follows the arc of swing of the vertical cable adjustment screw 42. Rotation, clockwise or counterclockwise, of the horizontal adjustment screw 40 may affect the tilt of the tablet 46 when in the horizontal position 49 but may also affect the display's tilt in other positions. A vertical tilt adjustment screw 42 is connected to a mounting bracket 41 via a pilotable threaded stud. The vertical tilt adjustment screw 42 moves the cable attachment point 48 primarily towards or away from the display tablet 46 when the display tablet 46 is in the vertical position 43. The vertical tilt adjustment screw 42's movement of attachment point 48 is not liner as it follows the arc of swing of the horizontal cable adjustment screw 40. Rotation, clockwise or counterclockwise, of the vertical adjustment screw 42 may affect the tilt of the display tablet 46 when in the vertical position 43 but may also affect the display's tilt in other positions.

In one embodiment, display tablet 46 is a detachable computer display tablet that may be coupled to display arm 14 through display holder 47. However, in other embodiments, display table 46 may be permanently affixed to display holder 47.

In one embodiment, extension spring 44 connects at one end to display arm 14 and at an other end to mounting bracket 41 such that a counter torque is imparted on display arm 14 when it is lowered. One or multiple extension springs may be used.

Figure 5:
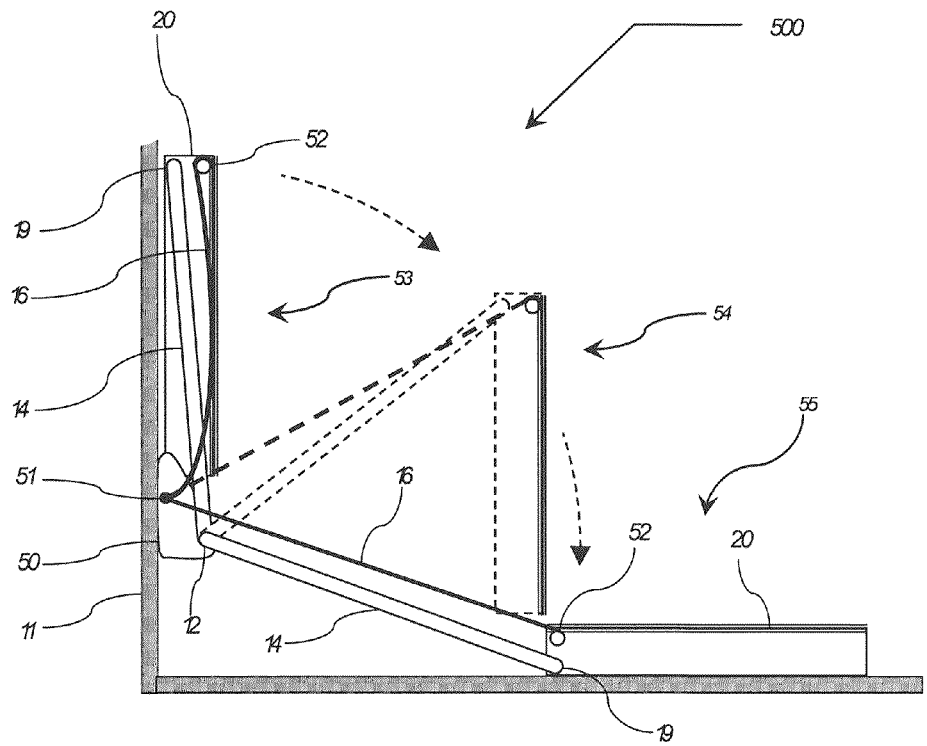
FIG. 5 illustrates another embodiment of a perspective view of a wall mounted hinge with a fixed cable attachment point on a display device and a slack cable to impart rotation of the display device.

FIG. 5 illustrates another embodiment of a perspective view of a mounted hinge having a portion of display arm rotation that allows for a slack cable. Apparatus 500 of FIG. 5 shows base 50 mounted on vertical surface 11. When display 20 is in vertical position 53, cable 16 is slack such that cable 16 may hang loosely between attachment points 50 and offset cam 52. As the display arm 14 is rotated downward, as indicated by the dashed arrows, display arm 14 reaches a rotation point 54 where the cable 16 becomes taut. At this point, the display 20 can either tilt toward or away from the base 50. In one embodiment, the display 20 tilts away from the base 50 as shown in FIG. 5. In one embodiment, a cam 52 is attached to display 20 and wrapped by cable 16 such that when the cable becomes taut the cam 52 will impart a torque on the display 20 to bias the display's tilt to rotate away from the base 50, and into a horizontal position. The biasing action can also be accomplished by incorporating a torsion spring between the display 20 and the display arm 14 such that the display is biased to rotate away from the base 50. Once the cable becomes taut, a lever arm created between the pivot point 19 and cable tangent point at cam 53 imparts a torque to rotate the display 20 away from the base 50.

In one embodiment, cable 16 is attached to the display base 50 at a fixed point 51. This configuration has the advantage of simplified mechanical complexity.

In one embodiment the display 20 does not incorporate a display mount and is directly coupled with the display arm 14 and cable attachment point 52.

As disclosed above, various embodiments are directed towards providing useful mechanisms for using a cable actuated hinge to move a display from an elevated vertical position away from the user to a lower horizontal position closer to the user are among the considerations, that embodiments of the present invention have been made.

Further, various embodiments provide a useful mechanism for a cable actuated hinge. While the specific embodiments contain many methods of connecting a base to a *display via a cable and display arm they each share at least one common theme—that the display is pivotally connected to abuse by at least one arm, the arm(s) also pivotally connect to a *display, and one or more cable(s) connect between the base and the *display, such that when the *display is lowered the cable pulls on the display to impart a torque at arm(s) pivot point to rotate the *display away from the base.

It is noted that still other embodiments are envisaged. For example, it is possible to combine different features of the embodiments to create yet additional embodiments to suit a given need. For example, by combining a direct cable attachment point at display holder in FIG. 4 with a slack cable design of FIG. 5, it's possible to create a more mechanically simple design.

The above specification, examples, and data provide a complete description of the manufacture and use of the composition various embodiments. Since many embodiments of the invention can be made without departing from the spirit and scope of the invention, the invention resides in the claims hereinafter appended.

What is claimed as new and desired to be protected by Letters Patent of the United States is:

1. An apparatus usable to support a computer monitor, the apparatus comprising:
    a hinge base assembly;
    at least one display arm having a first end that is pivotally connected to the hinge base assembly and a second end that is pivotally coupled to the computer monitor; and
    a cable having a first end that is pivotally connected to the hinge base assembly, and a second end that is rotationally attached to a cam at the computer monitor, such that when the display arm is lowered, a torque is imparted forcing the computer monitor to rotate about a pivot point such that a display screen on the computer monitor is repositioned from a vertical position to a horizontal position, the cable unwinding from around the cam.

2. The apparatus of claim 1, wherein a connection point on the hinge base assembly where the first end of the cable is pivotally connected is selectable to allow a tilt of the computer monitor to be controlled relative to a pivot angle of the at least one display arm.

3. The apparatus of claim 1, wherein the hinge base assembly further comprises:
    a torsion spring that provides a torque to enable rotation of the at least one display arm.

4. The apparatus of claim 1, wherein at least one pivot connection point for at least one of the first or the second end of the at least one display arm is configured to limit a computer monitor movement when the at least one display arm is located in a selected tilt position.

5. The apparatus of claim 1, further comprising:
    the computer monitor; and
    a display mount having a first end being attached to the computer monitor and a second end being pivotally connected to the second end of the at least one display arm, and is configured to rotate about the pivotal connection.

6. The apparatus of claim 1, wherein the first end of the cable being further pivotally connected to a movable attachment point that is adjustable in one or more of a vertical position or a horizontal position relative to the hinge base assembly.

7. The apparatus of claim 1, wherein the hinge base assembly is configured to attach to a vertical support structure or rest on a horizontal support structure.

8. A hinge assembly usable to support a computer monitor, the hinge assembly comprising:
 a base assembly;
 at least one display arm having a first end that is pivotally connected to the base assembly and a second end that is pivotally coupled to the computer monitor; and
 a cable having a first end that is pivotally connected to the base assembly, and a second end that is rotationally attached to a cam at the computer monitor, such that when the display arm is lowered, a torque is imparted forcing the computer monitor to rotate about a pivot point such that a display screen on the computer monitor is repositioned from a vertical position to a horizontal position, the cable unwinding from around the cam.

9. The hinge assembly of claim 8, wherein an extension spring is connected at one end to at least one display arm and at a second end to a mounting bracket portion of the base assembly such that a counter torque is imparted on the at least one display arm when the at least one display arm is lowered.

10. The hinge assembly of claim 8, wherein when the computer monitor is in the vertical position the cable is slack, and as the at least one display arm is lowered, the cable becomes taut thereby imparting the torque to bias the display screen to rotate into the horizontal position.

11. The hinge assembly of claim 8, wherein the base assembly further comprises:
 a torsion spring that provides a torque to enable rotation of the at least one display arm.

12. The hinge assembly of claim 8, wherein at least one pivot connection point for at least one of the first or the second end of the at least one display arm is configured to limit a computer monitor movement when the at least one display arm is located in a selected tilt position.

13. The hinge assembly of claim 8, further comprising:
 the computer monitor; and
 a display mount, the display mount having a first end being attached to the computer monitor and a second end being pivotally connected to the second end of the at least one display arm, and is configured to rotate about the pivotal connection.

14. The hinge assembly of claim 8, wherein the first end of the cable being further pivotally connected to a movable attachment point that is adjustable in one or more of a vertical position or a horizontal position relative to the base assembly.

15. A system, comprising:
 a computer monitor;
 a base assembly;
 at least one display arm having a first end that is pivotally connected to the base assembly and a second end that is pivotally coupled to the computer monitor; and
 a cable having a first end that is pivotally connected to the base assembly, and a second end that is rotationally attached to a cam at the computer monitor, such that when the display arm is lowered, a torque is imparted forcing the computer monitor to rotate about a pivot point such that a display screen on the computer monitor is repositioned from a vertical position to a horizontal position, the cable unwinding from around the cam.

16. The system of claim 15, wherein when the computer monitor is in the vertical position the cable is slack, and as the at least one display arm is lowered, the cable becomes taut thereby imparting the torque to bias the display screen to rotate into the horizontal position.

17. The system of claim 15, wherein at least one pivot connection point for at least one of the first or the second end of the at least one display arm is configured to limit the computer monitor movement when the at least one display arm is located in a selected tilt position.

18. The system of claim 15, wherein the first end of the cable being further pivotally connected to a movable attachment point that is adjustable in one or more of a vertical position or a horizontal position relative to the base assembly.

* * * * *